United States Patent Office 3,331,858
Patented July 18, 1967

3,331,858
3,6-DIHYDRO-2H-PYRAN-2-ONES
James C. Martin, Kingsport, Tenn., assignor to Eastman Kodak Company, Rochester, N.Y., a corporation of New Jersey
No Drawing. Filed Sept. 3, 1965, Ser. No. 485,099
10 Claims. (Cl. 260—343.5)

This application is a continuation-in-part of my copending application Ser. No. 314,887, filed Oct. 9, 1963, now U.S. Patent No. 3,277,089.

This invention relates to novel organic compounds and to a novel method of preparation. More particularly it relates to novel 3,6-dihydro-2H-pyran-2-ones and to their preparation by the reaction of a substituted ketene with a ketene O,N-acetal having at least one α-hydrogen atom.

My copending patent application Ser. No. 314,887 discloses that when a ketene and a ketene O,N-acetal are caused to react in a nonpolar or low polarity solvent the reactants combine in a 1:1 molar ratio. I have now discovered that novel 3,6-dihydro-2H-pyran-2-ones can be obtained by the reaction of a substituted ketene and O,N-acetal in a 2:1 molar ratio in the presence of a solvent of high polarity.

The method of the invention and novel compounds can be represented as follows:

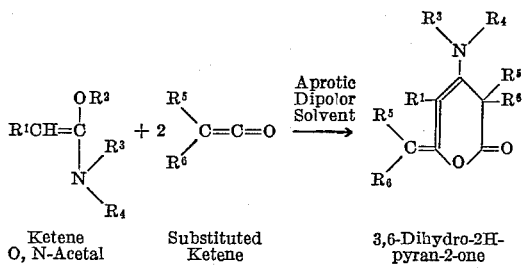

| Ketene O, N-Acetal | Substituted Ketene | 3,6-Dihydro-2H-pyran-2-one |

The process of the invention can employ broad classes of substituted ketenes and ketene O,N-acetals. In general, any compound having the characteristic substituted ketene functional group,

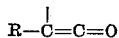

and any ketene O,N-acetal having at least one α-hydrogen atom and having the characteristic functional group

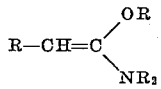

will in the presence of a high polarity solvent yield a 3,6-dihydro-2H-pyran-2-one in accordance with the invention.

The substituted ketene can be an aldo ketene or a keto ketene and, accordingly, one of the substituents $R^5$ or $R^6$ can be hydrogen. However, simple ketene is not operable in the process, so at least one of the substituents $R^5$ or $R^6$ must be an organic radical. In other words the ketene must have no more than one α-hydrogen atom.

The substituents $R^1$, $R^5$ and $R^6$ of the ketene and the ketene O,N-acetal, taken singly, can be selected from a broad class of monovalent substituents including, hydrogen, halogen atoms, and organic radicals having up to about 8 carbon atoms that are free of labile hydrogen atoms, e.g., as in amino and hydroxyl groups. These can include, for example, such monovalent organic radicals as: alkyl and cycloalkyl, particularly lower alkyl, cyclopentyl and cyclohexyl; phenyl and phenyl substituted with one or more lower alkyl or lower alkoxy radicals; thienyl; alkenyl, particularly lower alkenyl; and carbalkoxy. Taken collectively, $R^5$ and $R^6$ of the ketene can also be an alkylene radical that forms with the carbon to which $R^5$ and $R^6$ are attached a 4 to 6 membered carbocyclic ring, e.g., as in cyclopentane and cyclohexane. Preferably $R^5$ and $R^6$ are hydrogen, lower alkyl or lower alkylene.

$R^2$ of the ketene O,N-acetal is a monovalent hydrocarbon radical free of non-aromatic unsaturation and having up to about 6 carbon atoms, such as lower alkyl, cycloalkyl, or phenyl.

The amino substituents $R^3$ and $R^4$ of the ketene O,N-acetal taken singly, are monovalent hydrocarbon radicals of up to about 8 carbon atoms which are free of non-aromatic unsaturation, e.g., alkyl, cycloalkyl, phenyl, and lower alkyl-substituted phenyl. Taken collectively, the substituents $R^3$ and $R^4$ can be the atoms necessary to complete a heterocyclic ring with the nitrogen atom, e.g., piperidino, morpholino, thiamorpholino, pyrrolidinyl, etc.

Typical examples of ketenes of the formula,

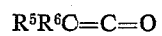

that can be employed in the reaction include methylketene, ethylketene, n-propylketene, isopropylketene, n-butylketene, isobutylketene, phenylketene, dimethylketene, ethylmethylketene, diethylketene, n-butylethylketene, di-n-propylketene, diisobutylketene, di-n-butylketene, di-n-heptylketene, ethyldodecylketene, dioctadecylketene, camphoketene, dibenzylketene, ditolylketene, diallylketene, dicarbethoxyketene, dichloroketene, tetramethyleneketene, pentamethyleneketene, diphenylketene, methylphenylketene, allylmethylketene, methylcarbethoxyketene, ethylcarbethoxyketene, n-propylcarbomethoxyketene, and the like.

An important characteristic of the method of the invention is that the ketene O-N-acetal must have at least one hydrogen atom on the α-carbon atom. Such ketene O,N-acetals of the formula,

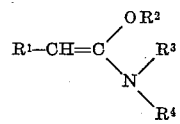

which are suitable for the method of the invention are disclosed by Meerwein et al., Ann. 641, 9 (1961). Examples include:
1-ethoxy-N,N-dimethylvinylamine,
1-(1-methoxyvinyl)piperidine,
1-(1-butoxyvinyl)morpholine,
N,N-dibutyl-1-butoxyvinylamine,
1-ethoxy-N,N-dimethyl-1-propenylamine,
1-ethoxy-N,N,dimethyl-2-phenylvinylamine,
1-ethoxy-N,N-diisopropyl-2-phenylvinylamine,
1-ethoxy-N,N-dimethyl-1-butenylamine,
1-ethoxy-N,N-dimethyl-1-decenylamine,
1-ethoxy-N-methyl-N-phenylvinylamine, etc.

Although the reactions employing any of the types of ketenes and O,N-acetals discussed above and the novel compounds having the cyclohexenedione structure obtained by such reactions are within the scope of the invention, there are significant differences between certain classes of the reactants and products. Thus, when the process of the invention employs a keto-ketene, such as dialkylketene, and an O,N-acetal having only one α-hydrogen atom, i.e., R' is an organic radical, the resulting product is a substituted cyclohexenedione having no hydrogen atoms on the carbon atoms adjacent to the carbonyl groups. In other words, all of the substituents $R^1$, $R^5$ and $R^6$ are organic radicals. Compounds of this type have superior thermal stability.

The reaction of the O,N-acetal and ketene is achieved by mixing the reactants in a highly polar solvent and the resulting cyclohexenedione is isolated and purified by distillation or recrystallization. The use of a highly polar solvent is a critical feature of the invention and is described in more detail hereinafter. Although the ketene and O,N-acetal react in a 2:1 molar ratio the molar ratio of the reactants in the reaction mixture is not critical. The 2:1 cycloaddition occurs in the presence of a highly polar solvent regardless of which reactant is present in excess. However, I obtain best results in using from 2 to 4 moles of ketene per mole of O,N-acetal.

Reaction temperatures in the range of about −20° C. to about 180° C. can be employed although reaction temperatures of about 0° C. to 100° C. are preferred and room temperature is often satisfactory. The optimum reaction temperature varies with such factors as the thermal stability of the desired product and the reactivities of the O,N-acetal and the ketene, the higher temperatures being used for the higher molecular weight reactants. The reaction time can vary considerably, e.g., from a few minutes to one or more days. The reaction time is influenced by such variables as temperature and the reactivity of the reactants.

The method of the invention is based on my discovery that 2:1 cycloaddition of the ketene and ketene O,N-acetal occurs when the reaction is carried out in a certain type of highly polar solvent. Solvents of low to medium polarity produce as the main reaction product a 1-alkoxy-1-dialkylamino-1-buten-3-one. Highly polar solvents unexpectedly yield the novel 2:1 adducts as the main or exclusive products of the reaction. The solvent for the process of the invention is an aprotic dipolar solvent having a dielectric constant (ε) of at least 20 when measured at 25° C. and audiofrequency, i.e., 20–20,000 cycles per second as reported by A. A. Maryott and E. R. Smith in "Table of Dielectric Constants of Pure Liquids," National Bureau of Standards Circular 514, Aug. 10, 1951. The examples of solvents of the type defined include: dimethylformamide, dimethylacetamide, acetonitrile, propionitrile, butyronitrile, tetrahydrothiophene-1,1-dioxide (commonly known as Sulfolane), propylene carbonate, ethylene carbonate, methyl isoamyl ketone, nitromethane, nitroethane, nitrobenzene, and the like. Further examples of suitable dipolar aprotic solvents are disclosed in the review by A. J. Parker, Quarterly Reviews, 16, 163 (1962). This review defines "dipolar aprotic solvents" and distinguishes them from hydrogen donors, e.g., water, methanol and formamide, which are classed as protic solvents. It should be understood that the solvent for the process of the invention must dissolve both the O,N-acetal and the ketene and must be substantially inert, i.e., it should not react with the reactants or the products to any substantial extent within the time required for the desired reaction.

Both reactants can be added simultaneously to the reaction vessel or the ketene can be added to the ketene O,N-acetal. I generally avoid the inverse addition because ketene polymers are sometimes produced when the O,N-acetal is added to the ketene.

The following examples illustrate the preparation of compounds in accordance with the invention.

*Example 1*

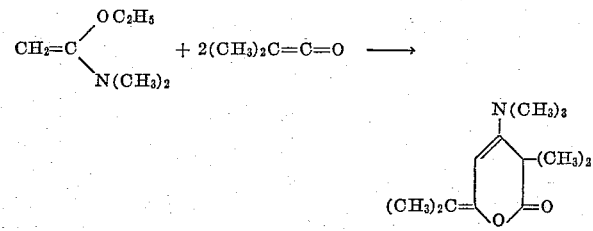

To a stirred solution of 50 g. (0.435 mole) of 1-ethoxy-N,N-dimethylvinylamine in 300 ml. of acetonitrile under nitrogen was added 61.5 g. (0.88 mole) of dimethylketene in small portions. The exothermic reaction was kept between −10 and +10° by means of a Dry Ice-acetone bath. Stirring was continued for 2 hr., then the reaction mixture was filtered to remove polymeric material. Distillation of the filtrate through a 12-in. packed column gave 64.5 g. (71 percent) of 3,3-dimethyl-4-(dimethylamino)-3,6-dihydro-6-isopropylidene-2H-pyran - 2 - one, B.P.107–108° (0.95 mm.), $n_D^{20}$ 1.5446.

*Analysis.*—Calcd. for $C_{12}H_{19}NO_2$: C, 68.8; H, 9.1; N, 6.7; mol. wt., 209. Found: C, 68.5; H, 9.2; N, 6.9; mol. wt. (B.P. elevation in benzene), 205.

The NMR spectrum of this material as measured at 40 mc. with a Varian model V4300B spectrometer showed the following peaks (in c.p.s. relative to water as an external standard): −22 [>C=CH]; 92 [—N(CH$_3$)$_2$]; 126 [>C(CH$_3$)$_2$]; and 138 [>C(CH$_3$)$_2$]. The relative peak areas agreed with these assignments.

*Example 2*

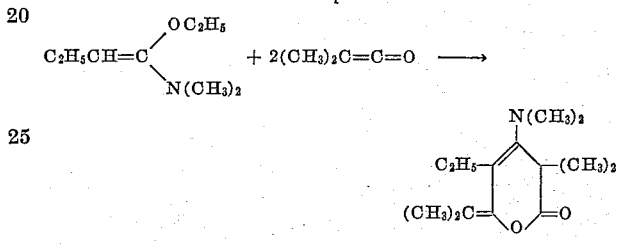

To a solution of 14.3 g. (0.1 mole) of 1-ethoxy-N,N-dimethyl-1-butenylamine in 100 ml. of dimethylacetamide was added 17.5 g. (0.25 mole) of dimethylketene. The reaction was exothermic but was controlled at 25–40° by an ice bath. Distillation of this solution through a 6-in. Vigreux column gave 16.2 g. (58 percent) of 5-ethyl-3,3-dimethyl-4-(dimethylamino)-3,6-dihydro - 6 - isopropylidene-2H-pyran-2-one, B.P. 120–122° (0.7 mm.).

*Example 3*

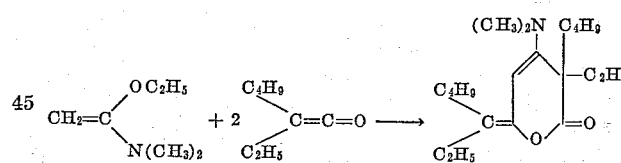

A solution of 11.5 g. (0.1 mole) of 1-ethoxy-N,N-dimethylvinylamine and 25.2 g. (0.2 mole) of butylethylketene in 150 ml. of nitromethane is refluxed for 4 hr. Distillation of the reaction solution through a 6-in. Vigreux column gives a good yield of 3-butyl-6-(1-ethylpentylidene)-3-ethyl-4 - (dimethylamino) - 3,6-dihydro-2H-pyran-2-one, B.P. 140–146° (0.5 mm.).

*Example 4*

Under the general conditions of Example 1, the following ketenes and ketene O,N-acetals react to give the products shown:

| Ketene | Ketene O,N-Acetal | Product |
|---|---|---|
| $(C_6H_5)_2C=C=O$ | $C_6H_5CH-C\begin{smallmatrix}OC_2H_5\\N(C_2H_5)_2\end{smallmatrix}$ | (structure with $N(C_2H_5)_2$, $C_6H_5$, $(C_6H_5)_2$) |
| $(C_8H_{17})_2C=C=O$ | $CH_2=C\begin{smallmatrix}OC_4H_9\\N(CH_3)_2\end{smallmatrix}$ | (structure with $N(CH_3)_2$, $(C_8H_{17})_2$) |

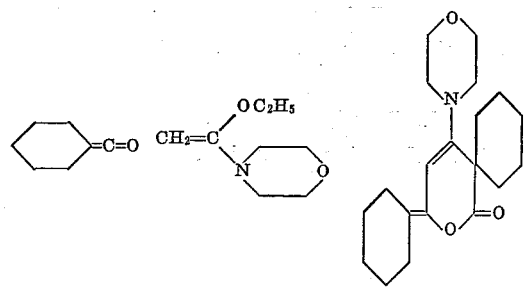

The compounds of the invention are useful as chemical intermediates. For example, they can be converted to useful pyrazoles by reaction with an acid salt of hydrazine such as hydrazine sulfate or hydrazine dihydrochloride. The resulting pyrazoles are useful as additives for synthetic ester lubricating oils in the manner disclosed in U.S. Patent No. 2,971,912. For instance, when these oils contain an antioxidant such as phenothiazine that breaks down at high temperatures to form products that are corrosive to copper and silver, the pyrazoles made from my novel compounds will protect against such corrosion. The pyrazoles are also useful to stabilize halogen containing polymers, e.g., polyvinyl chloride, against degradation by heat or light, in the manner disclosed in U.S. Patent No. 2,946,765.

The following example illustrates the use of my novel compounds to produce pyrazoles that are useful as described above.

*Example 5*

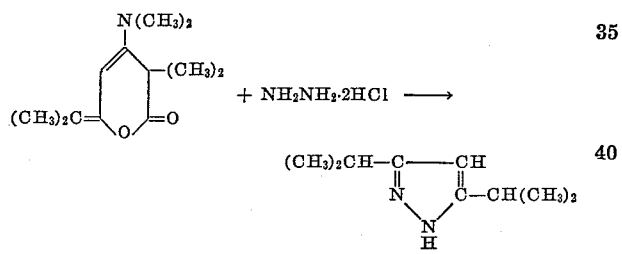

A mixture of 20.9 g. (0.1 mole) of 3,3-dimethyl-4-(dimethylamino)-3,6 - dihydro-6-isopropylidene-2H-pyran-2-one and 10.5 g. (0.1 mole) hydrazine dihydrochloride in 150 ml. of 5 percent hydrochloric acid solution was stirred and heated on a steam bath for 6 hr. The resulting solution was made alkaline with 20 percent sodium hydroxide solution and extracted with ether. The ether solution was dried over anhydrous magnesium sulfate and distilled through a 6-in. Vigreux column to give 3,5-diisopropylpyrazole, B.P. 101–106°/12 mm.

Although the invention has been described in considerable detail with particular reference to certain preferred embodiments thereof, variations and modifications can be effected within the spirit and scope of the invention as described hereinabove, and as defined in the appended claims.

I claim:
1. A compound of the formula

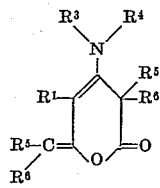

wherein $R^1$, $R^5$ and $R^6$ taken singly are hydrogen, halogen or organic radicals of up to 8 carbon atoms free of labile hydrogen atoms selected from the group consisting of alkyl, cycloalkyl, phenyl and phenyl substituted with an alkyl or lower alkoxyalkyl radical, thienyl; alkenyl and carbalkoxy; $R^5$ and $R^6$ taken collectively are alkylene forming a 5 to 6 membered carbocyclic ring with the carbon to which they are attached; $R^3$ and $R^4$ taken singly are hydrocarbon radicals of up to 8 carbon atoms free of non-aromatic unsaturation and taken collectively with the nitrogen atom form a piperidino, morpholino, thiamorpholino or pyrrolidinyl ring; and when $R^5$ or $R^6$ is hydrogen the other is an organic radical as defined hereinabove.

2. A compound according to claim 1 wherein $R^5$ and $R^6$ taken singly are hydrogen or lower alkyl and $R^3$ and $R^4$ taken singly are lower alkyl.

3. A compound according to claim 1 in which $R^1$, $R^3$, $R^4$, $R^5$ and $R^6$ when taken singly are lower alkyl.

4. 3,3 - dimethyl - 4-(dimethylamino)-3,6-dihydro-6-isopropylidene-2H-pyran-2-one.

5. 5 - ethyl - 3,3 - dimethyl-4-(dimethylamino)-3,6-dihydro-6-isopropylidene-2H-pyran-2-one.

6. 3 - butyl-6-(1-ethylpentylidene)-3-ethyl-4-(dimethylamino)-3,6-dihydro-2H-pyran-2-one.

7. The method which comprises combining a ketene O,N-acetal of the formula,

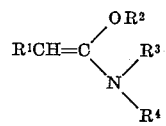

with a ketene of the formula, $R^5R^6C=C=O$, and recovering a compound of the formula

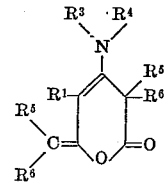

wherein $R^1$, $R^5$ and $R^6$ taken singly are hydrogen, halogen or organic radicals of up to 8 carbon atoms free of labile hydrogen atoms selected from the group consisting of alkyl, cycloalkyl, phenyl and phenyl substituted with an alkyl or alkoxyalkyl radical; thienyl; alkenyl and carbalkoxy; $R^5$ and $R^6$ taken collectively are alkylene forming a 5 to 6 membered saturated carbocyclic ring with the carbon to which they are attached; $R^3$ and $R^4$ taken singly are hydrocarbon radicals of up to 8 carbon atoms free of non-aromatic unsaturation and taken collectively with the nitrogen atom form a piperidino, morpholino, thiamorpholino or pyrrolidinyl ring; and when $R^5$ or $R^6$ is hydrogen the other is an organic radical as defined hereinabove; and wherein $R^2$ is a monovalent hydrocarbon radical free of non-aromatic unsaturation and having up to 6 carbon atoms; the ketene and ketene O,N-acetal being combined in an inert solvent having a dielectric constant greater than 20 as measured at 25° C.

8. The method of preparing 3,3-dimethyl-4-(dimethylamino) - 3,6 - dihydro-6-isopropylidene-2H-pyran-2-one which comprises adding dimethylketene to a solution of 1-ethoxy-N,N-dimethylvinylamine in an inert solvent having a dielectric constant of at least 20 as measured at 25° C. and at a reaction temperature of 0° C. to 100° C.

9. The method of preparing 5-ethyl-3,3-dimethyl-4-(dimethylamino) - 3,6 - dihydro - 6-isopropylidene-2H-pyran-2-one which comprises adding dimethylketene to a solution of 1-ethoxy-N,N-dimethyl-1-butenylamine in an inert solvent having a dielectric constant of at least 20 as measured at 25° C. and at a reaction temperature of 0° C. to 100° C.

10. The method of preparing 3-butyl-6-(1-ethylpentylidene) - 3 - ethyl - 4-(dimethylamino)-3,6-dihydro-2H-pyran-2-one which comprises adding butylethylketene to a solution of 1-ethoxy-N,N-dimethylvinylamine in an inert solvent having a dielectric constant of at least 20 as measured at 25° C. and at a reaction temperature of 0° C. to 100° C.

References Cited

Hasek et al.: J. Org. Chem., vol. 29, pp. 2513–16 (1964).

ALEX MAZEL, *Primary Examiner.*

J. NARCAVAGE, *Assistant Examiner.*